United States Patent
Itwaru

(10) Patent No.: US 9,547,861 B2
(45) Date of Patent: Jan. 17, 2017

(54) SYSTEM AND METHOD FOR WIRELESS COMMUNICATION WITH AN IC CHIP FOR SUBMISSION OF PIN DATA

(75) Inventor: Mark Itwaru, Toronto (CA)

(73) Assignee: Mark Itwaru, Toronto (CA)

( * ) Notice: Subject to any disclaimer, the term of this patent is extended or adjusted under 35 U.S.C. 154(b) by 20 days.

(21) Appl. No.: 13/397,261

(22) Filed: Feb. 15, 2012

(65) Prior Publication Data

US 2013/0211929 A1   Aug. 15, 2013

Related U.S. Application Data

(63) Continuation-in-part of application No. 13/105,803, filed on May 11, 2011.

(Continued)

(51) Int. Cl.
*G06Q 20/20* (2012.01)
*G06Q 30/06* (2012.01)
(Continued)

(52) U.S. Cl.
CPC ........ *G06Q 20/4012* (2013.01); *G06Q 20/325* (2013.01); *G06Q 20/352* (2013.01); *G06Q 20/353* (2013.01)

(58) Field of Classification Search
USPC ....... 705/67, 39, 16; 455/558, 411; 380/270; 235/380, 441
See application file for complete search history.

(56) References Cited

U.S. PATENT DOCUMENTS 5,729,594 A   3/1998 Klingman
5,778,173 A   7/1998 Apte
(Continued)

FOREIGN PATENT DOCUMENTS

CA   2769235 A1   2/2011
DE   102007059816 A1   6/2009
(Continued)

OTHER PUBLICATIONS

International Search Report and Written Opinion dated Aug. 27, 2012 issued from the Canadian Intellectual Property Office relating to PCT International Patent Application No. PCT/CA2012/000453.
(Continued)

*Primary Examiner* — Scott Zare
*Assistant Examiner* — Reva R Danzig
(74) *Attorney, Agent, or Firm* — Grant Tisdall; Gowling WLG (Canada) LLP

(57) ABSTRACT

A system and method for coordinating processing of a cardholder present financial transaction between the cardholder and a merchant system. The system collects a transaction amount of the financial transaction associated with merchant identification information of the merchant system. The system sends an authentication request using a wireless communication protocol configured for proximity communication between a communication interface of a computer device and a wireless communication enabled integrated circuit (IC) chip of a payment card, the authorization request including an IC command expected by computer hardware of the IC chip. The system receives an authentication response from the computer hardware of the IC chip by the wireless communication protocol, the authentication response including an encrypted value generated by the computer hardware of the IC chip.

9 Claims, 5 Drawing Sheets

Related U.S. Application Data

(60) Provisional application No. 61/485,075, filed on May 11, 2011.

(51) Int. Cl.

| | | |
|---|---|---|
| *G07G 1/12* | (2006.01) | |
| *G06Q 20/40* | (2012.01) | |
| *G06Q 20/32* | (2012.01) | |
| *G06Q 20/34* | (2012.01) | |
| *G06Q 20/04* | (2012.01) | |
| *G06Q 20/10* | (2012.01) | |

(56) References Cited

U.S. PATENT DOCUMENTS

| | | |
|---|---|---|
| 5,799,285 A | 8/1998 | Klingman |
| 5,903,721 A | 5/1999 | Sixtus |
| 5,923,735 A | 7/1999 | Swartz et al. |
| 5,963,915 A | 10/1999 | Kirsch |
| 5,970,475 A | 10/1999 | Barnes et al. |
| 5,992,752 A | 11/1999 | Wilz, Sr. et al. |
| 6,012,144 A | 1/2000 | Pickett |
| 6,038,589 A | 3/2000 | Holdsworth |
| 6,058,250 A | 5/2000 | Harwood et al. |
| 6,078,902 A | 6/2000 | Schenkler |
| 6,086,618 A | 7/2000 | Al-Hilali et al. |
| 6,088,683 A | 7/2000 | Jalili |
| 6,138,146 A | 10/2000 | Moon et al. |
| 6,233,565 B1 | 5/2001 | Lewis et al. |
| 6,332,134 B1 | 12/2001 | Foster |
| 6,675,008 B1 | 1/2004 | Paik et al. |
| 6,704,873 B1 | 3/2004 | Underwood |
| 7,379,921 B1 | 5/2008 | Kiliccote |
| 7,387,250 B2 | 6/2008 | Muni |
| 7,581,257 B1 | 8/2009 | O'Hara |
| 8,016,187 B2 | 9/2011 | Frantz et al. |
| 8,275,699 B2 | 9/2012 | Shader et al. |
| 2002/0062281 A1 | 5/2002 | Singhal |
| 2002/0066039 A1 | 5/2002 | Dent |
| 2002/0066042 A1* | 5/2002 | Matsumoto ............ G06Q 20/02 726/7 |
| 2002/0069165 A1 | 6/2002 | O'Neil |
| 2002/0077976 A1 | 6/2002 | Meyer et al. |
| 2002/0107745 A1 | 8/2002 | Loeser |
| 2003/0195843 A1 | 10/2003 | Matsuda et al. |
| 2005/0029358 A1 | 2/2005 | Mankins |
| 2005/0125301 A1 | 6/2005 | Muni |
| 2005/0197968 A1 | 9/2005 | Das et al. |
| 2007/0119917 A1* | 5/2007 | Tomikawa ........... G06Q 20/341 235/380 |
| 2007/0194123 A1 | 8/2007 | Frantz et al. |
| 2007/0244811 A1 | 10/2007 | Tumminaro |
| 2007/0255620 A1 | 11/2007 | Tumminaro et al. |
| 2008/0172314 A1 | 7/2008 | Hahn-Carlson |
| 2008/0222048 A1 | 9/2008 | Higgins et al. |
| 2008/0285755 A1* | 11/2008 | Camus ................. H04L 9/3247 380/270 |
| 2008/0313081 A1 | 12/2008 | Wee |
| 2009/0090783 A1 | 4/2009 | Killian et al. |
| 2009/0108080 A1 | 4/2009 | Meyer et al. |
| 2009/0222353 A1 | 9/2009 | Guest et al. |
| 2009/0240626 A1 | 9/2009 | Hasson et al. |
| 2009/0254479 A1 | 10/2009 | Pharris |
| 2009/0254485 A1 | 10/2009 | Baentsch et al. |
| 2009/0266893 A1* | 10/2009 | Chen ..................... G06Q 20/32 235/441 |
| 2010/0138344 A1 | 6/2010 | Wong et al. |
| 2010/0169223 A1* | 7/2010 | Yuan ..................... G06Q 20/12 705/67 |
| 2010/0211506 A1 | 8/2010 | Chang et al. |
| 2011/0145093 A1 | 6/2011 | Paradise et al. |
| 2011/0212707 A1* | 9/2011 | Mahalal ................ G06Q 20/32 455/411 |
| 2011/0244920 A1* | 10/2011 | Coppinger ............ G06Q 20/20 455/558 |
| 2011/0251892 A1 | 10/2011 | Laracey |
| 2012/0030121 A1* | 2/2012 | Grellier .............. G06Q 20/3229 705/67 |
| 2012/0066081 A1 | 3/2012 | Shader et al. |
| 2012/0078751 A1 | 3/2012 | Macphail et al. |
| 2012/0130889 A1* | 5/2012 | Lyons ................ G06Q 20/3272 705/39 |
| 2012/0136797 A1* | 5/2012 | Coppinger ........... G06Q 20/105 705/67 |
| 2012/0290418 A1 | 11/2012 | Itwaru |

FOREIGN PATENT DOCUMENTS

| | | |
|---|---|---|
| EP | 0765068 A2 | 3/1997 |
| EP | 0813325 A2 | 12/1997 |
| EP | 0926611 A2 | 6/1999 |
| EP | 1921578 A1 | 5/2008 |
| EP | 2073160 A1 | 6/2009 |
| EP | 2088549 A1 | 8/2009 |
| WO | 9637848 A1 | 11/1996 |
| WO | 0195591 A1 | 12/2001 |
| WO | 02102133 A2 | 12/2002 |
| WO | 2011112752 A1 | 9/2011 |
| WO | 2011127354 A2 | 10/2011 |
| WO | 2011130422 A2 | 10/2011 |
| WO | 2012111019 A1 | 8/2012 |
| WO | 2012151660 A1 | 11/2012 |
| WO | 2012158506 A1 | 11/2012 |

OTHER PUBLICATIONS

Gao, et al., "A 2D Barcode-Based Mobile Payment System", 2009 Third International Conference on Multimedia and Ubiquitous Engineering, pp. 320-329, Jun. 4-6, 2009.

International Search Report and Written Opinion dated May 24, 2012 issued from the Canadian Intellectual Property Office relating to PCT International Patent Application No. PCT/CA2012/000223.

International Search Report and Written Opinion dated Jul. 30, 2012 issued from the Canadian Intellectual Property Office relating to PCT International Patent Application No. PCT/CA2012/000452.

Ion, et al., "Don't trust POS terminals! Verify in-shop payments with your phone", presented at Pervasive 2008 Sixth International Conference on Persuasive Computing, Sydney Australia, http://www.persuasive2008.org/.

International Search Report and Written Opinion dated Apr. 15, 2013 issued from the Canadian Intellectual Property Office relating to PCT International Patent Application No. PCT/CA2013/000135.

International Search Report and Written Opinion dated Apr. 29, 2013 issued from the Canadian Intellectual Property Office relating to PCT International Patent Application No. PCT/CA2013/000136.

\* cited by examiner

SYSTEM AND METHOD FOR WIRELESS COMMUNICATION WITH AN IC CHIP FOR SUBMISSION OF PIN DATA

This application claims priority to U.S. Provisional Patent Application Ser. No. 61/485,075 filed May 11, 2011 and is a Continuation-In-Part to U.S. patent application Ser. No. 13/105,803, filed May 11, 2011, all of which are hereby incorporated by reference in their entirety.

FIELD

The present invention is related to wireless collection and confirmation of data between a mobile device and a chip of a payment card.

BACKGROUND

Until the introduction of Chip and PIN, all face-to-face credit or debit card transactions used a magnetic stripe or mechanical imprint to read and record account data, and a signature for verification. Under this system, the customer handed their card to the clerk at the point of sale, who either "swiped" the card through a magnetic reader or made an imprint from the raised text of the card. In the former case, the account details were verified and a slip for the customer to sign was printed. In the case of a mechanical imprint, the transaction details were filled in and the customer signed the imprinted slip. In either case, the clerk verified that the signature matches that on the back of the card to authenticate the transaction.

The magnetic of mechanical imprint systems proved reasonably effective, but had a number of security flaws, including the ability to steal a card in the post, or to learn to forge the signature on the card. More recently, technology has become available on the black market for both reading and writing the magnetic stripes, allowing cards to be easily cloned and used without the owner's knowledge. A further disadvantage of these systems is that they do not allow for Card Present (CP) transactions for on-line or over the telephone purchases, as there is no way in such a remote transaction for the merchant to be able to satisfactorily verify, according to payment card company standards, that the cardholder was actually present at the time of remote order placement. This is a disadvantage for merchants providing remote order placement, as transaction fees for CP transaction are lower than for Card-not-present (CNP) transactions.

Due to the exploding popularity of on-line shopping in recent years, CNP transactions, where neither the card nor its holder are physically present at the point of sale with the merchant (e.g. orders by mail, telephone, fax or the Internet) are becoming more common and increasingly popular with customers. Unfortunately, CNP transactions are also appealing to criminals because you have no opportunity to physically check the card or the identity of the cardholder, there is always some risk. The fact that a transaction is authorised and an authorisation code is issued does not guarantee payment, it simply means that the card has not been reported lost or stolen and that there are sufficient funds in the account at the time of authorisation. It does not guarantee that the address given to the merchant by the cardholder during the remote order placement is correct. If the sale is fraudulent, the full amount may be charged back to the merchant.

Even for face-to-face transactions using chip and PIN enabled cards, where the customer and their card are with them at the point of sale, a further disadvantage with this is that the customer must use the keypad of the merchant terminal to enter in their PIN information. Fraudulent incidences are on the rise where PIN information has been stolen through the use of fraudulent merchant terminals designed for this purpose. Accordingly, cardholders are currently experiencing a decreased sense of payment security, especially in those situations where the merchant is considered by the cardholder as possibly suspect such as in foreign countries or for stores in which the cardholder is unfamiliar.

SUMMARY

Presently there is a need for a system and method to facilitate card holder present transactions between entities using wireless communication that addresses at least one of the identified problems in the current state of the art.

Accordingly, there is a need for a transaction environment and supportive technology that provides proof that the cardholder was present for the transaction, did authorize the transaction, and further assisted the transaction through personally providing PIN information when a payment card is used at the time of submitting payment for products or services, in particular for remote order placement and/or in situations where a PIN is required but the cardholder does not wish to use the keypad provided by the terminal equipment of the merchant. It is also recognised that cardholder present transactions may not involve the use of PIN data (i.e. PIN data entered and confirmed by the chip).

Current disadvantages of state of the art systems is that they do not allow for Card Present (CP) transactions for on-line or over the telephone purchases, as there is no way in such a remote transaction for the merchant to be able to satisfactorily verify, according to payment card company standards, that the cardholder was actually present at the time of remote order placement. A further disadvantage of state of the art systems this is that the customer must use the keypad of the merchant terminal to enter in their PIN information, thereby exposing them to fraudulent incidences. Contrary to current systems there is provided system and method configured for coordinating processing of a cardholder present financial transaction between the cardholder and a merchant system. The system collects a transaction amount of the financial transaction associated with merchant identification information of the merchant system. The system sends an authentication request using a wireless communication protocol configured for proximity communication between a communication interface of a computer device and a wireless communication enabled integrated circuit (IC) chip of a payment card, the authorization request including an IC command expected by computer hardware of the IC chip. The system receives an authentication response from the computer hardware of the IC chip by the wireless communication protocol, the authentication response including an encrypted value generated by the computer hardware of the IC chip. The system sends a transaction request to a payment processing system for settlement of the financial transaction, the transaction request including the transaction amount and the encrypted value, and receives confirmation of settlement of the financial transaction.

A first aspect provided is a non-transitory computer readable storage medium with an executable program application stored thereon, the program application configured for coordinating processing of a cardholder present financial transaction between the cardholder and a merchant system, wherein the program application instructs a computer processor to perform the following steps of: collecting a transaction amount of the financial transaction associated with merchant identification information of the merchant system; sending an authentication request using a wireless communication protocol configured for proximity communication between a communication interface of a computer device and a wireless communication enabled integrated circuit (IC) chip of a payment card, the authorization request including an IC command expected by computer hardware of the IC chip; receiving an authentication response from the computer hardware of the IC chip by the wireless communication protocol, the authentication response including an encrypted value generated by the computer hardware of the IC chip; sending a transaction request to a payment processing system for settlement of the financial transaction, the transaction request including the transaction amount and the encrypted value; and receiving confirmation of settlement of the financial transaction.

A second aspect provided is a non-transitory computer readable storage medium, wherein the program application is further configured to instruct a computer processor to perform the steps of: entering PIN data using a data entry interface of the computer device that is separate from a data entry interface of the merchant system; including the PIN data in the authentication request, such that the authentication response includes PIN authentication data confirmed by the computer hardware of the IC chip; and including the PIN authentication data in the transaction response.

A third aspect provided is a method for coordinating processing of a cardholder present financial transaction between the cardholder and a merchant system, the method having steps of: collecting a transaction amount of the financial transaction associated with merchant identification information of the merchant system; sending, using a computer processor, an authentication request using a wireless communication protocol configured for proximity communication between a communication interface of a computer device and a wireless communication enabled integrated circuit (IC) chip of a payment card, the authorization request including an IC command expected by computer hardware of the IC chip; receiving, using a computer processor, an authentication response from the computer hardware of the IC chip by the wireless communication protocol, the authentication response including an encrypted value generated by the computer hardware of the IC chip; sending a transaction request to a payment processing system for settlement of the financial transaction, the transaction request including the transaction amount and the encrypted value; and receiving confirmation of settlement of the financial transaction.

A fourth aspect provided is a merchant system for coordinating processing of a cardholder present financial transaction between the cardholder and the merchant system, the system comprising: a computer processor coupled to a memory, wherein the computer processor is programmed to coordinate processing of the financial transaction by: providing to the cardholder a transaction amount of the financial transaction associated with merchant identification information of the merchant system, the financial transaction requiring an authentication response from computer hardware of an IC chip of a payment card used by the cardholder for the financial transaction, the authentication response including an encrypted value generated by the computer hardware of the IC chip; receiving confirmation of settlement of the financial transaction from a payment processing system based on a transaction request sent by a computer device of the cardholder to the payment processing system for settlement of the financial transaction, the transaction request including the transaction amount and the encrypted value, the confirmation of settlement received via a communications network coupling the payment processing system and the merchant system; and providing the confirmation of settlement to an order and account processing systems of the merchant system, such that the transaction request was generated using a user interface of the computer device that is separate from a data entry interface of the order and account processing systems.

A fifth aspect provided is a method for coordinating processing of a cardholder present financial transaction between the cardholder and a merchant system, the method comprising: providing to the cardholder a transaction amount of the financial transaction associated with merchant identification information of the merchant system, the financial transaction requiring an authentication response from computer hardware of an IC chip of a payment card used by the cardholder for the financial transaction, the authentication response including an encrypted value generated by the computer hardware of the IC chip; receiving, using a computer processor, confirmation of settlement of the financial transaction from a payment processing system based on a transaction request sent by a computer device of the cardholder to the payment processing system for settlement of the financial transaction, the transaction request including the transaction amount and the encrypted value, the confirmation of settlement received via a communications network coupling the payment processing system and the merchant system; and providing, using a computer processor, the confirmation of settlement to an order and account processing systems of the merchant system, such that the transaction request was generated using a user interface of the computer device that is separate from a data entry interface of the order and account processing systems.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Figure 1:
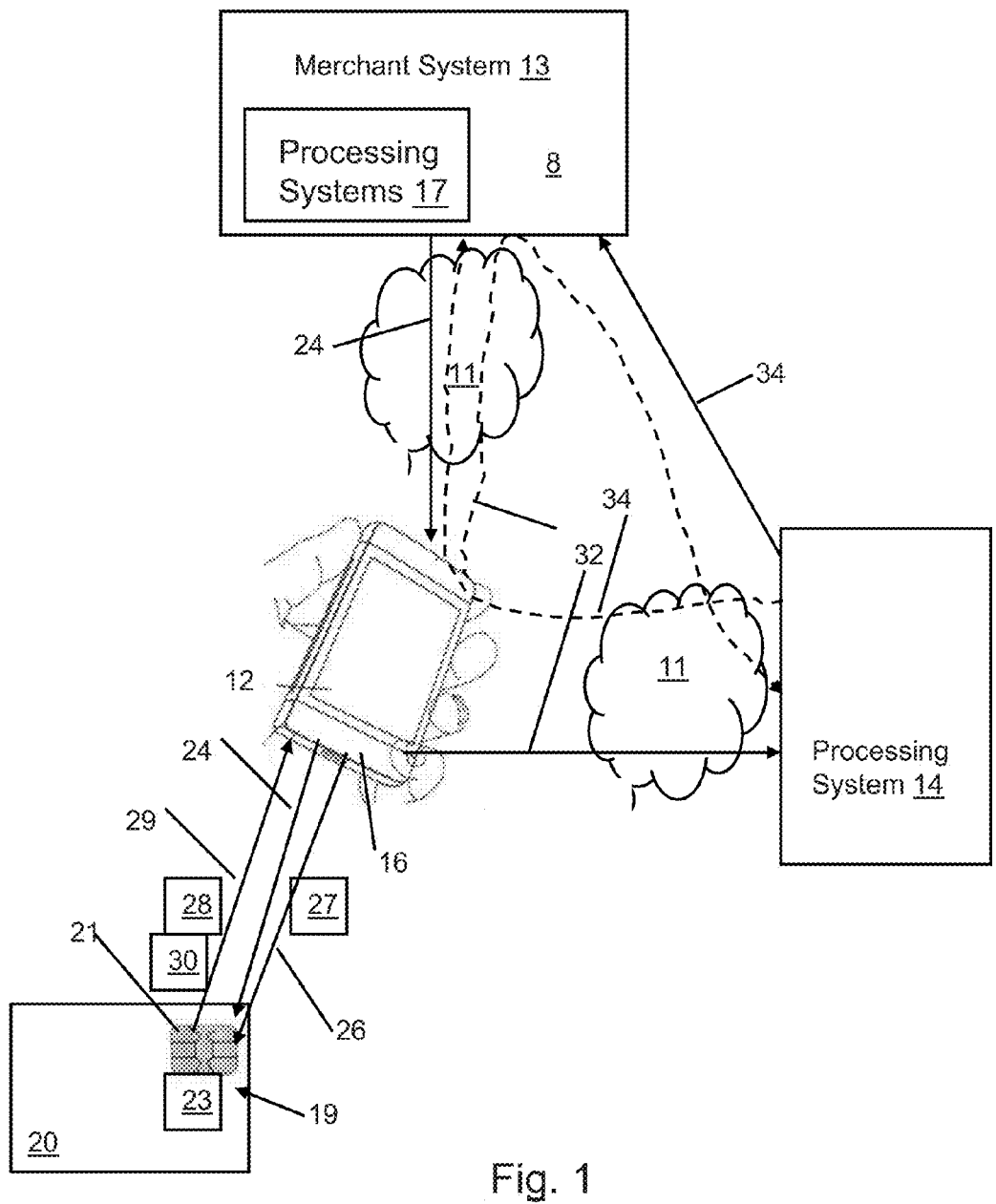
FIG. 1 is a block diagram of components of a payment card transaction system.

Referring to FIG. 1, shown is a payment card transaction system 10 including a computer device 12 (e.g. mobile device), a merchant order and account processing system 13 (implemented by computer device 8) that can include a point of sale (POS) terminal (also sometimes referred to as Point of Purchase (POP), and a payment transaction processing system 14. The merchant system 13 is the location where a financial transaction can be initiated and confirmation of transaction acceptance or rejection is received, such that the merchant is the business (bricks and mortar and/or on-line store or service) that takes payment from the cardholder for their products or services. It should be recognized that the merchant system 13 can include a physical POS terminal (e.g. an electronic cash register) in close physical proximity to the cardholder at the time of purchase (i.e. providing a keypad or touch screen (or other data entry interface) for use by the cardholder that is separate from a user interface 104 of a computer device 12 of the cardholder). Alternatively, the merchant system 13 can be embodied as an on-line merchant order service (e.g. a merchant order web site) that is accessed remotely by the cardholder over a communications network 11 using an appropriate network communication protocol 50 (e.g. wired and/or wireless). It is also recognized that the merchant system 13 can include an automated teller machine (ATM), such that part of the transaction information required from the cardholder of the payment card 20 is entered and provided to the merchant system 13 using the user interface 104 of the computer device 12 (see FIG. 3), rather than using the keypad (or other data entry interface) provided by the ATM.

Settlement of the financial transaction can be defined as performing the settlement (e.g. debit of funds specified in the financial transaction from an account 72 and crediting of the funds in to another account 70). Further, transaction settlement can be defined as where the funds amount is transferred from the one account 70 to the other account 72, i.e. the credit and debit transactions of the funds amount against the respective accounts 70,72 are either performed (e.g. in real time) or promised to be performed (e.g. included in a batch transaction to be performed later in the day or following business day), such that the accounts 70,72 are of the cardholder (e.g. credit card account) and the merchant (e.g. merchant back account) administered through financial institutions (not shown) associated with or otherwise implementing the payment processing system 14.

In view of the above, the merchant system 13 includes order and account processing systems 17 (e.g. a merchant order interface including a web service interface for interacting with the cardholder) that can include accounting systems for keeping records of financial transactions related to product orders, accounting systems for sending financial transactions directly to the payment transaction processing system 14 for settlement and receiving and processing settlement information related to the processing of the financial transaction, POS systems including user interfaces (e.g. keypads) for entry of data related to financial transactions by customers (e.g. the cardholder), and/or product ordering systems for generating bills of sale, order invoices, issuing of sales receipts (printed or electronic) and/or related accounts receivable systems.

The computer device 12 is configured through a payment application 16 and a wireless communication interface 102 to communicate directly with a chip 19 (e.g. radio communication enabled integrated circuit (IC)) of a payment card 20 using a wireless communication protocol 52 (see FIG. 3) that can communicate integrated circuit (IC) chip 19 commands (further discussed below). The payment card 20 can be referred to interchangeably as a smart card, chip card, or integrated circuit card (ICC), such that the chip 19 contains computer hardware 21 (e.g. volatile memory, microprocessor components, and/or antenna) and card data 23 that can communicate (or be communicated) wirelessly with the communication interface 102 of the computer device 12. It is recognized that the card data 23 can be stored on the computer hardware 21 in encrypted form and can include data such as but not limited to: cardholder name; card number; card expiry date; and a list of data (e.g. tags) that are used in the approve or decline decision of a merchant transaction request 24. The merchant transaction request 24 can include, for example, merchant identification information, POS type (such as in person local transaction or remote network transaction), and transaction amount and/or transaction type (such as retail item purchase, restaurant purchase, digital product purchase such as online music, and/or subscription or service registration involving subscription/registration fees). Further, it is recognised that the card data 23 can be stored on the computer hardware 21 as read only and/or as read and write data (i.e. can be modified such as in the case where a card PIN is changed).

Figure 3:
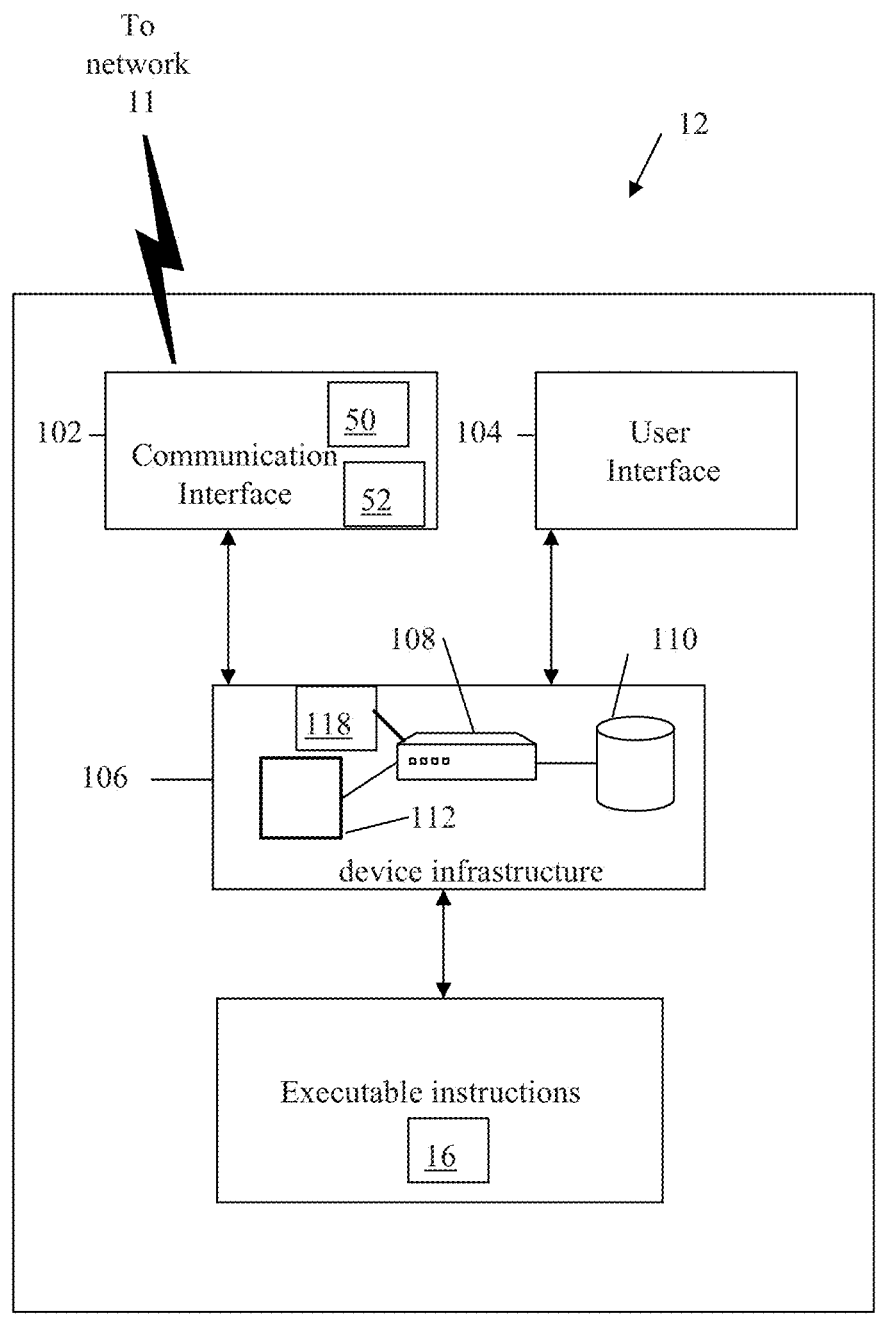
FIG. 3 is a block diagram of an example computer device for implementing the payment application of FIG. 2.

The payment application 16 of the computer device 12 is configured to receive the merchant transaction request 24, for example electronically from a POS terminal as captured by an imager 118 (e.g. camera) of the computer device 12, electronic message communicated to the computer device 12 from the POS terminal (for example as a wired or wireless network 11 message, electronically from a remote on-line network 11 accessed merchant system, and/or as transaction data entered manually via the user interface 104 of the computer device 12—see FIG. 3. The payment application 16 can be further configured to communicate through the communication interface 102 (for example using near field communication (NFC) based wireless communication protocols 52) with the chip 19 for: optionally sending the merchant transaction data 24, and an authentication or confirmation request 26 for personal identification number (PIN) information 23 stored on the chip 19. The PIN authentication request 26 including PIN data 27 is preferably entered by the user via the user interface 104 (see FIG. 3) of the computer device 12 (it is noted that sending the data 24 can be done together or separately with the PIN authentication request 26) instead of using any data entry interface of the merchant system 13 (e.g. POS keypad), and receive cryptogram data 28 (for example including payment card account number and expiry date) from the chip 19 in a transaction response 29 (cryptogram) that includes or is otherwise separate from PIN confirmation data 30 (i.e. indicating submitted PIN data 27 matches PIN information 23 stored on the chip 19). It is recognised that for smaller amount financial transactions (e.g. less than a specified amount threshold such as $50), entry of and authentication of the PIN may not be a requirement of the financial transaction, i.e. the payment processing system 14 would process the financial transaction for smaller amounts without the presence of PIN authentication data.

Further, the confirmation request 26 can include chip commands (further described below) used by the computer hardware 21 of the chip 19 understand and confirm the submitted PIN data 27. The payment application 16 is also configured to send over a communications network 11, using a network communications protocol 50 (e.g. TCP/IP, HTTP, HTTPS, etc.), a transaction authorization request 32 to the payment transaction processing system 14 (either directly or via the merchant system 13), such that the transaction authorization request 32 includes both the cryptogram data 28 and the PIN confirmation data 30. Upon receipt of the transaction authorization request 32 by the payment transaction processing system 14, the payment transaction processing system 14 generates a transaction authorization code 34 and then sends over the network 11 the transaction authorization code 34 (e.g. indicating transaction authorization request 32 is either approved or declined) to the merchant system 13 (either directly or via the computer device 12).

Payment Card 20

Referring again to FIG. 1, it recognized that the payment card 20 includes the chip 19 containing stored PIN information 23. The chip 19 of the payment card 20 provides identification, authentication, data storage and application processing with respect to use of the payment card for payment transactions. The payment card 20 can be a chip card such as but not limited to: a debit card; a credit card; a pre-paid credit card or a loyalty card, for example. In the case of a pre-paid credit card, it is not a true credit card since no credit is offered by the card issuer, rather the card-holder spends money which has been "stored" via a prior deposit by the card-holder or someone else, such as a parent or employer, and can be used in similar ways just as though it were a regular credit card. It is also recognized that the payment card 20 can be referred to as contactless smart cards or proximity cards where a card reader uses wireless communication protocols 52, such as Near Field Communication (NFC), to communicate with the chip computer hardware 21. The wireless communication protocol 52 standards applicable to contactless smart cards or proximity cards can refer to the older 125 kHz devices or the newer 13.56 MHz contactless RFID cards (in which the chip 19 is an RFID chip embedded within the card substrate). Modern proximity cards are covered by the ISO/IEC 14443 (proximity card) standard. Payment cards 20 that include an embedded antenna and a microchip (e.g. in the computer hardware 21) can communicate wirelessly with the communication interface 102 of computer device 12, via the chip 19 antenna.

In terms of NFC tag devices (e.g. chips 19), these contain data 23 and are read-only but can also be rewriteable. The chips 19 can be custom-encoded by their manufacturers or use the specifications provided by the NFC Forum, an industry association charged with promoting the technology and setting key standards. The tags devices can securely store personal data such as debit and credit card information, loyalty program data, PINs and networking contacts, among other information. There currently are four types of tag devices which provide different communication speeds and capabilities in terms of configurability, memory, security, data retention and write endurance. Tag devices currently offer between 96 and 4,096 bytes of memory for the data 23.

The chips 19 of proximity cards as well as vicinity/proximity cards can be powered by resonant inductive coupling via an LC circuit including an IC, capacitor, and coil are connected in parallel. The card reader (e.g. computer device 12) via the communication interface 102 produces an electromagnetic field that excites the coil and resonant current charges the capacitor, which in turn energizes and powers the IC. A second card type is the contactless smart card, in which the card communicates with and is powered by the reader (e.g. computer device 12) through RF induction technology (at data rates of 106-848 kbit/s). These smart cards use only proximity to an antenna to communicate. Like smart cards with contacts, contactless cards do not have an internal power source. Instead, they use an inductor to capture some of the incident radio-frequency interrogation signal produced from the card reader (i.e. the communication interface 102), rectify it, and use it to power the card's electronics (i.e. computer hardware 21).

Another standard, ISO/IEC 7816-3, defines the transmission protocol 52 between chip cards 20 and readers (e.g. computer device 12 configured by the payment application 16). Using this protocol 52, data is exchanged wirelessly between the computer hardware 21 (providing a cryptographic application) and the computer device 12 in application protocol data units (APDUs). This comprises sending a command via the communication interface 102 to the computer hardware 21 of the card, the computer hardware 21 processing the command, and sending a response that is received by the communication interface 102 and then processed by the payment application 16 of the computer device 12. The protocol 52 uses the following example commands: application block (of the cryptographic application); application unblock; card block; external authenticate (7816-4); generate application cryptogram; get data (7816-4); get processing options; internal authenticate (7816-4); PIN change/unblock; read record (7816-4); select (7816-4); and verify (7816-4). The configuration of the computer hardware 23 of the chip 19 provides, via the cryptographic application, an integrated security module with (Data Encryption Standard) DES, Triple-DES encryption and Master/Session and (Derived Unique Key Per Transaction) DUKPT key management schemes. Other encryption schemes can include RSA and (Secure Hash Algorithm) SHA to provide authentication of the card 20 to the processing merchant system 13 and/or the card issuer's host processing system 14. It is recognized that the cryptographic application (implementing the encryption scheme(s)) can be embodied as software, hardware (i.e. IC) or a combination of both, however due to desired processing speeds IC embodiments are currently preferred.

The computer hardware 21 of the chip 19 includes a secure cryptoprocessor as a dedicated computer on a chip or microprocessor for carrying out cryptographic operations (e.g. for generating the cryptogram), embedded in a packaging with multiple physical security measures, which give it a degree of tamper resistance. The purpose of a secure cryptoprocessor is to act as the keystone of a security sub-system, reducing the need to protect the rest of the sub-system with physical security measures. Cryptoprocessors input program instructions in encrypted form, decrypt the instructions to plain instructions which are then executed within the same cryptoprocessor chip where the decrypted instructions are inaccessibly stored. Data processed by a cryptoprocessor is also frequently encrypted. The cryptoprocessor chip can be an embedded microchip that stores information in a secure, encrypted format.

PIN

Cardholder Present Transaction (CPT) can be defined as a card payment transaction where the cardholder is in the same physical location as the card that is used to make the payment. In general these are considered more secure because they benefit from the use of Chip & PIN technology. Alternatively, Cardholder Not Present Transaction can be defined as a card payment where the cardholder is not in the same physical location as the card 20 that is used to make the payment. Typically these payments would occur when the cardholder is buying from a web site or buying over the phone. In general, Cardholder Not Present Transactions (CNPT) are considered less secure because they rely on disclosure of the card information (start and end date, card number, CVC, issue number) and therefore are subject to higher merchant transaction fees from the merchant financial institution (e.g. CNPT transaction charges can be three times as much as CPT transaction charges).

Therefore, it is advantageous to have the card payment transaction (i.e. the merchant transaction request 24) to be processed as a CPT. Higher charges for CNPTs are justified by the merchant financial institutions since once the merchant transaction request 24 has been authorised and an authorization code issued, it means that the payment card 20 is recognized by the payment processing system 14 as not been reported lost or stolen and that there are sufficient funds available at the time of authorisation. However, it is a useful safety measure, but does not guarantee payment. Nor does it guarantee that the address or other information given to the merchant by the cardholder is correct or that the genuine cardholder actually placed the order.

In terms of the merchant, it can be the merchant financial institution that processes the payment transaction resulting from use of the payment card 20 for ultimately providing transaction settlement that gives the merchant funds to pay for products and services bought using the card. On the other hand, the Issuer is the financial institution that provided the payment card 20 to the cardholder to enable them to pay for products and services using that card, such that the Issuer typically only charges the cardholder an annual user fee and interest charges on unpaid card balances. In other words, the merchant financial institution charges a fee per transaction while the issuer financial institution may or may not.

The combination of chip 20 cryptogram generation and PIN confirmation is a preferred way to accept card payments when the payment card 20 and cardholder are present. The PIN can be defined as a secret numeric (however can also include alpha or other non-numeric characters) password shared between the cardholder and the payment card transaction system 10, for use in authentication of the cardholder to the system 10.

Historically, the payment card 20 was inserted physically into the POS terminal and the PIN entered by the cardholder using a keypad of the merchant terminal. Therefore, card holders had greater control over chip cards because the card remained in the possession of the cardholder. In this case, traditional electronic verification systems allowed merchants to verify in a few seconds that the card was valid and the credit card customer had sufficient credit to cover the purchase, allowing the verification to happen at time of purchase. This traditional verification was enabled by using a physical credit card payment terminal or point-of-sale (POS) system with a communications link to the merchant's acquiring bank. However fraudulent activity (such as reading and copying PIN information) by unscrupulous merchants (e.g. "eavesdroppers", "man in the middle attackers") remains a concern. Further, in the case of on-line payments, a physical POS terminal is simply not available.

Therefore, to help technically address the above noted prior art technical deficiencies, in operation of the payment application 16 configured computer device 12, upon receiving the PIN entered via the user interface 104 of the computer device 12, via the communication interface 102 using the wireless communication protocol 52, the chip 19 (i.e. hardware 21) looks up the PIN (i.e. stored in the card data 23) and compares the looked-up PIN with the received PIN. The cardholder is granted access when the PIN entered matches with the stored PIN, as further described below. In particular, it is advantageous in use of the payment application 16 for PIN submission and confirmation for the cardholder, as this PIN information is not entered in unencrypted form (i.e. by using the keypad of the merchant). Further, in the case where the merchant is an on-line website, the cardholder can still take advantage of enacting a CPT, as compared to a CNPT, thereby possibly receiving preferential treatment (e.g. reduced product/service charges, upgraded products/services, etc.) from the on-line merchant in exchange for their reduced transaction fees charged to them by the merchant financial institution (part of the payment processing system 14).

Therefore, the provision of a technical solution, including the payment application 16, involves smartcard technology of the embedded microchip 19 and automatic authentication using PIN information entered via the computer device 12 (i.e. using the user interface 104 and the communications interface 102). When a customer wishes to pay for goods using this system, the chip 19 of the payment card is placed into proximity of the computer device 12 that operates as a chip reader, which accesses directly the chip 19 on the card 20 using the communication protocol 52. For example, once the card 20 has been verified as authentic by reading the chip 20 via the communications interface 102, the customer enters the PIN via the user interface 104 of the computer device 12 instead of using any merchant data entry device if available (part of the merchant system 13), which is then submitted to the chip 19 on the smartcard 20 also via the communications interface 102. If the two match, the chip 20 tells the computer device 12 that the entered PIN was correct, otherwise it informs the computer device 12 that the PIN was incorrect, as further described below with respect to the wireless communication protocol 52 and the communication interface 102.

Communication Interface 102

The computer device 12 has the communication interface 102 (see FIG. 3) that is used by the payment application 16 to communicate wirelessly (via the communication protocol 52) with the computer hardware 21 of the chip 19 on the payment card 20. One communication protocol 52 embodiment of the communication interface 102 is NFC, which is a set of standards for wireless communication enabled devices (i.e. those devices having antennas, such as the computer device 12 and the chip 19) to establish radio communication in physical proximity with each other by touching them together or otherwise bringing them into close proximity, usually no more than a few centimeters for example (NFC can be defined as short-range wireless technology typically communicating within a distance of 4 cm or less). Present applications include contactless transactions, data exchange, and simplified setup of more complex communications. In terms of the chip 19 on the payment card 20, communication between the respective antennas of the computer hardware 21 and the communication interface 102 is as the NFC enabled computer device 12 and the unpowered NFC chip 19, also referred to as a tag device.

Proximity wireless communication using the wireless communication protocol 52 is defined as wireless radio transmission of data between two devices (e.g. computer device and chip 19) that are within a physical proximity range to one another. The proximity range can be defined as the physical distance between the antennas of the two devices, for example less than 12 inches, preferably less than 6 inches, more preferably less than 3 inches, more preferably less than 1 inch and more preferably less 0.5 inches. It is recognised that in the event that the physical distance between the two devices (i.e. their antennas) are outside of the proximity range, the wireless communication via the wireless communication protocol 52 is interrupted or otherwise disabled.

A communications protocol is a system of digital message formats and rules for exchanging those messages in or between computing systems and in telecommunications. A protocol may have a formal description. Protocols may include signalling, authentication and error detection and correction capabilities. A protocol definition defines the syntax, semantics, and synchronization of communication; the specified behaviour is typically independent of how it is to be implemented. A protocol can therefore be implemented as hardware or software or both. For example, the network communications protocol 50 includes rules for data formats for data exchange and rules for network address formats for data exchange that identify both the sender network 11 address and the intended receiver(s) network 11 address.

The wireless communication protocol 52 used to facilitate peer to peer wireless communications locally (e.g. in radio transmission range of one another, also referred to as proximity wireless communication) between two devices also involves rules for data formats for data exchange but does not use rules for network addresses as the wireless communication protocol 52 may not include network addresses for each of the computer device 12 and chip 19 for directing the exchange of messages 25,29 between the wireless communication interface 102 of the computer device 12 and the computer hardware 21 of the chip 19.

Another example of the wireless communication protocol 52 is Bluetooth™, which can expose private data or allow the connecting party to control the Bluetooth device. For security reasons it can be necessary via the wireless communication protocol 52 to be able to recognize specific devices 12,19 and thus enable control over which devices 12,19 are allowed to connect to a given Bluetooth device. At the same time, it is useful for Bluetooth devices to be able to establish a connection without user intervention (for example, as soon as they are in range). Bluetooth uses a process called bonding, and a bond is created through a process called pairing. The pairing process is triggered either by a specific request from a user (e.g. device 12) to create a bond (for example, the user explicitly requests to "Add a Bluetooth device"), or it is triggered automatically when connecting to a service where (for the first time) the identity of a device is required for security purposes. These two cases are referred to as dedicated bonding and general bonding respectively. Pairing often involves some level of user interaction; this user interaction is the basis for confirming the identity of the devices 12,19. Once pairing successfully completes, a bond will have been formed between the two devices, enabling those two devices 12,19 to connect to each other in the future without requiring the pairing process in order to confirm the identity of the devices 12,19. When desired, the bonding relationship can later be removed by the user. In the case of computer device 12 and chip 19 bonding, it is recognised that the computer device 12 (via the wireless network interface 102) can be in control of the setup and teardown of the pairing or bonding.

In view of the above, for example, in the case of Wi-Fi, this wireless communication is considered to use the network 11 communication protocol 50, as WiFi communication requires both devices to be members (i.e. have network addresses on) of the same wireless network 11 and to somehow locate each other on that network and then negotiate some kind of user access. Further, WiFi communications via the network communication protocol 50 do not have a physical proximity range restriction between communicating devices, as long as the WiFi enabled devices are within range of third party wireless devices (e.g. cell towers, wireless router, etc.) that are part of the wireless network 11 and facilitate wireless communication routing through the third party (or intermediate computer device) between the WiFi enabled devices. In other words, the communication protocol 50 relies upon an intermediate computer device of the communications network 11 to act as a proxy device for network 11 communications between the devices. This is in comparison to the communication protocol 52, which provides for direct wireless communication between the devices 12,19 without using a proxy or intermediate device that is an agent of the wireless network 11 itself.

The wireless communication interface 102 of the computer 12 can be configured with wireless NFC standard protocols 52, including communication protocols and data exchange formats, for example based on existing radio-frequency identification (RFID) standards including ISO/IEC 14443, ECMA-340 ISO/IEC 18092, and FeliCa. The standards can include ISO/IEC 18092 and those defined by the NFC Forum. NFC operates at 13.56 MHz on ISO/IEC 18000-3 air interface and at rates ranging from 106 kbit/s to 424 kbit/s. It is recognized that NFC builds upon RFID systems by allowing two-way communication between device endpoints, where earlier systems such as contactless smart cards were one-way only. However, since unpowered NFC chips 20 can also be read by NFC devices, NFC is also capable of replacing earlier one-way applications for communication between device endpoints (e.g. mobile device 12 and chip 19). The NFC communication protocol 52 standards specify the modulation schemes, coding, transfer speeds and frame format of the RF interface of NFC devices, as well as initialization schemes and conditions required for data collision-control during initialization for both passive and active NFC modes. Furthermore, the NFC communication protocol 52 standards also define the transport protocol, including protocol activation and data-exchange methods.

NFC communication involves an initiator (i.e. the computer device 12) and a target (i.e. the chip 19), such that the initiator actively generates an RF field that can power the passive target. This enables NFC targets to take very simple form factors such as tag devices, stickers, key fobs, or chip cards that do not require batteries. It is also recognized that NFC peer-to-peer communication is possible, provided both devices are powered, for example where the chip 19 is also a powered device.

In terms of specific examples for communication interface 102 and computer hardware 21, as with proximity card technology, near-field communication uses magnetic induction between two respective loop antennas (of the communication interface 102 and the computer hardware 21) located within each other's near field or proximity range (e.g. theoretical working distance with compact standard antennas is currently up to 20 cm however practical working distance is about 4 centimeters or less), effectively forming an air-core transformer. NFC communications operate within the globally available and unlicensed radio frequency ISM band of 13.56 MHz, such that most of the RF energy can be concentrated in the allowed ±7 kHz bandwidth range but the full spectral envelope may be as wide as 1.8 MHz when using ASK modulation.

There are two modes of NFC communication that can be implemented between the communication interface 102 and the computer hardware 21, passive communication mode and active communication mode. Active communication mode is where both the initiator and target devices (respectively using the communication interface 102 and the computer hardware 21) communicate by alternately generating their own fields, such that a respective device can deactivates its RF field while it is waiting for data communicated from the other device. However, it is recognized that in this mode, both devices typically have power supplies and therefore current implementation of passive chips 19 currently precludes use of active communication mode in the system 10. However, it is contemplated that the computer hardware 21 of the chip 19 can also include a battery for independent power based on appropriate developments in battery technology. The currently employed passive communication mode for the system 10 is where the initiator device (i.e. the communication interface 102 of the computer device 12) provides a carrier field and the target device (i.e. the hardware 21 of the ship 19) answers by modulating the existing field. In this mode, the target device can draw its operating power from the initiator-provided electromagnetic field, thus making the target device operate as a transponder. Payment Application 16

Figure 2:
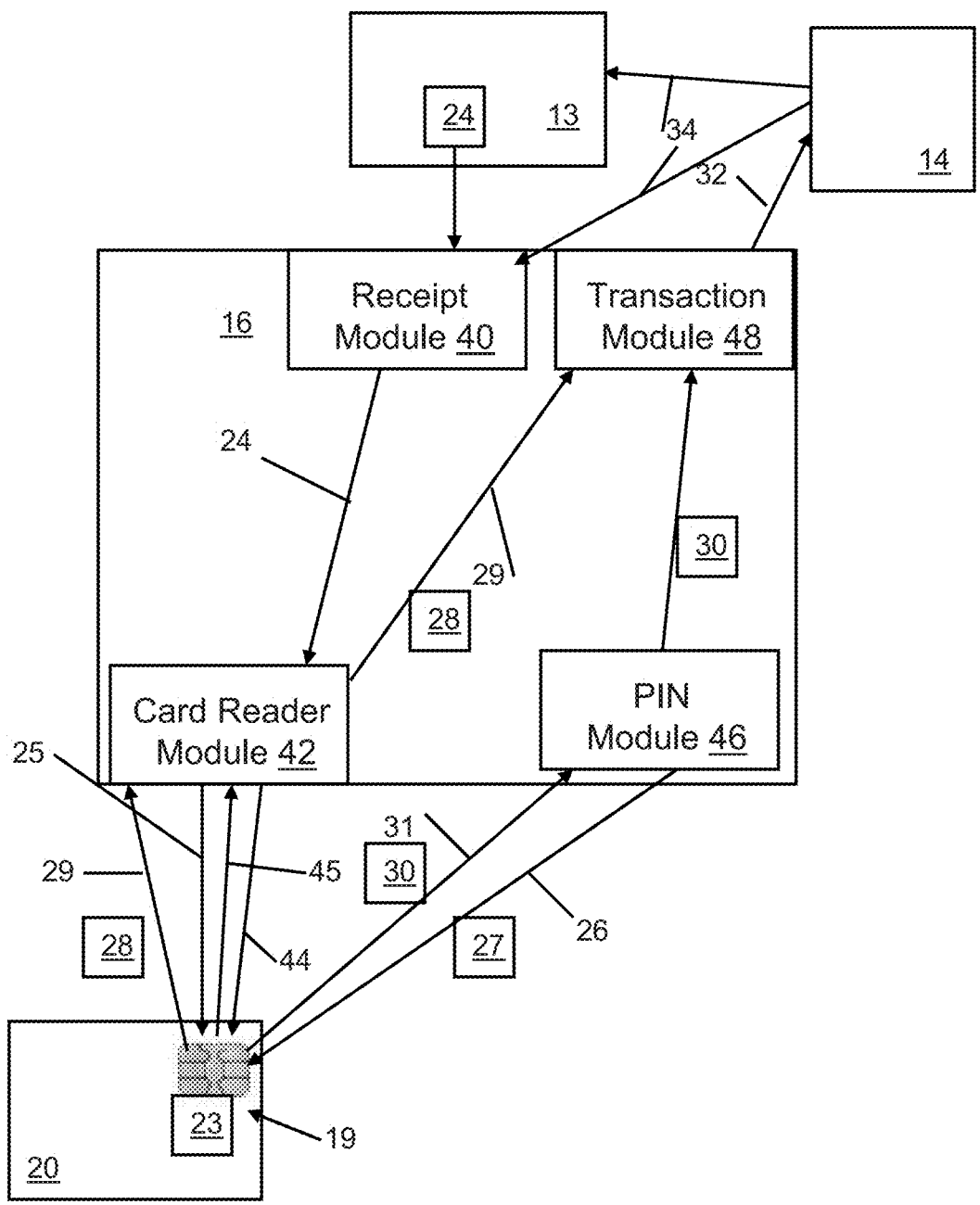
FIG. 2 is a block diagram of a payment application of the system of FIG. 1.

Referring to FIG. 2, shown is a receipt module 40 of the payment application 16 receiving transaction data of the merchant transaction request 24, such that the transaction data can include data such as but not limited to: transaction amount; currency; merchant identification information used to uniquely identify the merchant with the transaction payment processing system 14; a description of products or services being purchased; date of purchase; merchant location; identification information of a network address of the payment processing system 14 used by the merchant; and method of payment selected by cardholder (e.g. VISA™, Mastercard™, Debit, etc.). The transaction data can also include an indication as to what interface was used to provide the PIN data 27 (e.g. the merchant terminal, a data filed of an on-line form, the user interface of a computer device of the cardholder, etc.).

Receipt of the merchant transaction request 24 is used by a card reader module 42 of the payment application 16 to optionally send an initial query 44 to the chip 19 of a payment card 20 in range of the carrier field of the antenna of the communication interface 102, in order to receive a response 45 determining the content and format of data expected by the hardware 21 of the chip 19 in order to generate the transaction response 29 (e.g. including a cryptogram 28). A cryptogram can be defined as a type of digital signature or encrypted value 28 based on specific inputs for an individual card and transaction that makes each transaction unique. Since only the chip card 20 itself can create a valid cryptogram, the authorizing host can confirm that the actual card is present. In addition, the cryptogram is generated using secret keys inside the chip card, so key management is not required for merchants. The card issuer controls key management entirely.

The card reader module 42 collects the expected transaction data from the merchant transaction request 24 and any expected additional data (e.g. identification information of the individual cardholder, information identifying the mobile device, identification information of a network address of the payment processing system used by the cardholder), if any, and sends the collected transaction data via the communication interface 102 (e.g. using the wireless communication protocols 52 to generate the initiator RF carrier field) to the chip 19 as a transaction request 25 (e.g. a cryptogram request). For example, the transaction request 25 can include one or more Terminal action codes (TACs), including a generate application cryptogram command. Based on a decision (offline, online, decline) of the card reader module 42, the transaction request 25 can include a request of one of the following encrypted vales (e.g. cryptograms) generated from the chip 19: Transaction certificate (TC)—Offline approval; Authorization Request Cryptogram (ARQC)—Online authorization; or Application Authentication Cryptogram (AAC)—Offline decline. The card reader module 42 expects to receive response data 28 as one or more Issuer action codes (IACs), which are provided in the transaction response 29 transmitted by the hardware 21 of the chip 19 through modulation (i.e. by the antenna of the target chip 19) of the existing carrier field (i.e. initially generated by the antenna of the wireless communication interface 102). The response data 28 of the transaction response 29 can include the appropriate cryptogram (e.g. digital signature or encrypted value). It is recognized that the response data 28 created by the hardware 21 of the chip 19 can represents the digital signature of the transaction details which can be checked in real time by the card issuer (i.e. the transaction payment processing system 14). For example, the response data 28 can include the encrypted value embodying card number, card and/or expiry date, in addition to selected data of the expected transaction data submitted in the transaction request 25.

The cryptogram of the response data 28 can be defined as the encrypted value based on specific inputs for an individual card and transaction that makes each transaction unique. Since only the chip 19 itself can create a valid cryptogram, the authorizing host (e.g. the payment processing system 14) can confirm that the actual card is present during processing of the transaction between the computer device 12 and the card 20 during interaction of the cardholder with the merchant system 13. In addition, the cryptogram 28 is generated using secret keys inside the chip 19 (as provided by the hardware 21—e.g. via a cryptoprocessor), so key management is not needed for merchants. The card issuer controls key management entirely. Therefore, it is recognised that a chip transaction generates a unique transaction and because each transaction generates a different ID.

The payment application 16 also has a PIN module 46 that is configured to collect PIN data 27 entered by the cardholder via the user interface 104 (e.g. keypad) of the mobile device 12. The PIN authentication request 26, including the PIN data 27, is then sent via the communication interface 102 (e.g. using the wireless communication protocols 52 to generate the initiator RF carrier field) to the chip 19 as the PIN authentication request 26. It is recognized that the PIN authentication request 26 can include one or more relevant TACs. The PIN module 46 expects to receive PIN authentication data 30 as one or more Issuer action codes (IACs), for example, which are provided in an authentication response 31 transmitted by the hardware 21 of the chip 19 through modulation (i.e. by the antenna of the target chip 19) of the existing carrier field (i.e. initially generated by the antenna of the communication interface 102). The PIN authentication data 30 of the authentication response 31 can include the appropriate decision, either Approved in the case where the PIN data 27 matched the stored PIN data 23 of the hardware 21 or Declined in the case where the PIN data 27 did not match the stored PIN data 23 of the hardware 21.

It is recognized that wireless communication between the communication interface 102 of the computer device 12 and the hardware 21 of the chip 19 can be in a specific order or sequence, as implemented by the payment application 16. For example, in a first embodiment, the PIN authentication request 26 can be submitted first to the hardware 21, and the subsequent sending of the transaction request 25 is only done or otherwise accepted in the event where the PIN authentication data 30 (received the authentication response 31) is confirmed (for example by the PIN module 46) as Approved. In other words, the payment application 16 would not send the transaction request 25 (or the hardware 21 can refuse to accept and/or respond with the requested cryptogram) in the event that the PIN authentication data 30 indicates Declined. This is an example of a two stage interaction between the payment application 16 and the hardware 21 of the chip 19, such that Approval of the PIN authentication request 26 (i.e. the submitted PIN data 27 is deemed by the hardware 21 to match the stored PIN data 23) must be received before transaction request 25 can be sent or otherwise satisfied.

In a second embodiment, first the transaction request 25 is submitted before the PIN authentication request 26 is submitted. In another embodiment, both the transaction request 25 and the PIN authentication request 26 are sent to the hardware 21 in the same carrier field signal.

Referring again to FIG. 2, the payment application 16 can have a transaction module 48 that is configured to collect the PIN authentication data 30 (indicating Approved) and the transaction response 29 data (e.g. the cryptogram 28) and forward these in the transaction authorization request 32 to the payment transaction processing system 14. In return, the payment transaction processing system 14 generates the transaction authorization code 34 and then sends over the network 11 the transaction authorization code 34 (e.g. indicating transaction authorization request 32 is either approved or declined) to the merchant system 13 (either directly or via the mobile device 12). The payment transaction processing system 14 can also send details concerning whether the transaction was accepted or declined. It is recognized that the transaction authorization request 32 can include an authorisation response cryptogram (ARPC) and optionally an issuer script (a string of commands to be sent to the card hardware 21).

Example Operation of the System 10

Figure 4:
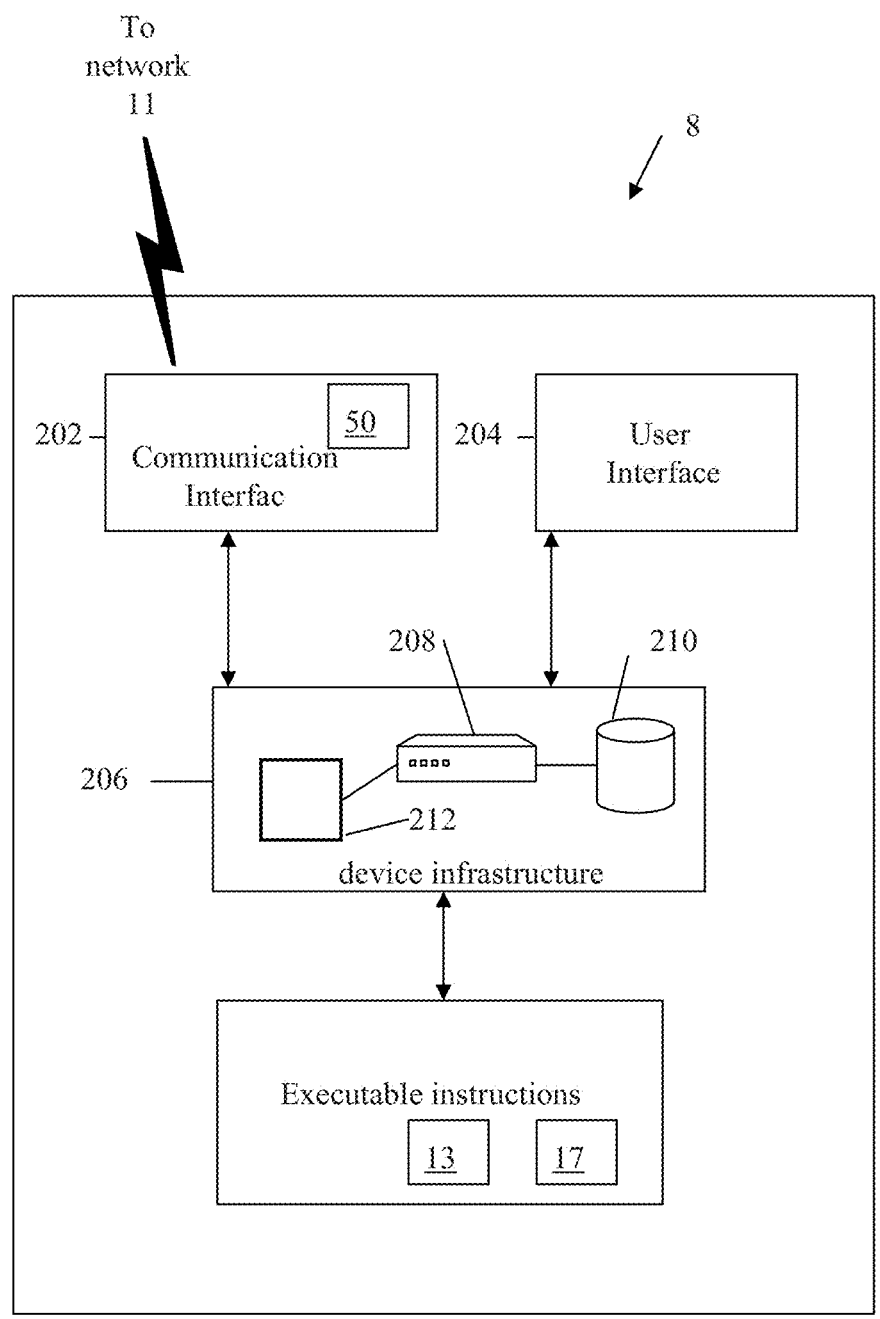
FIG. 4 is a block diagram of an example computer device for implementing the merchant system of FIG. 1.
Figure 5:
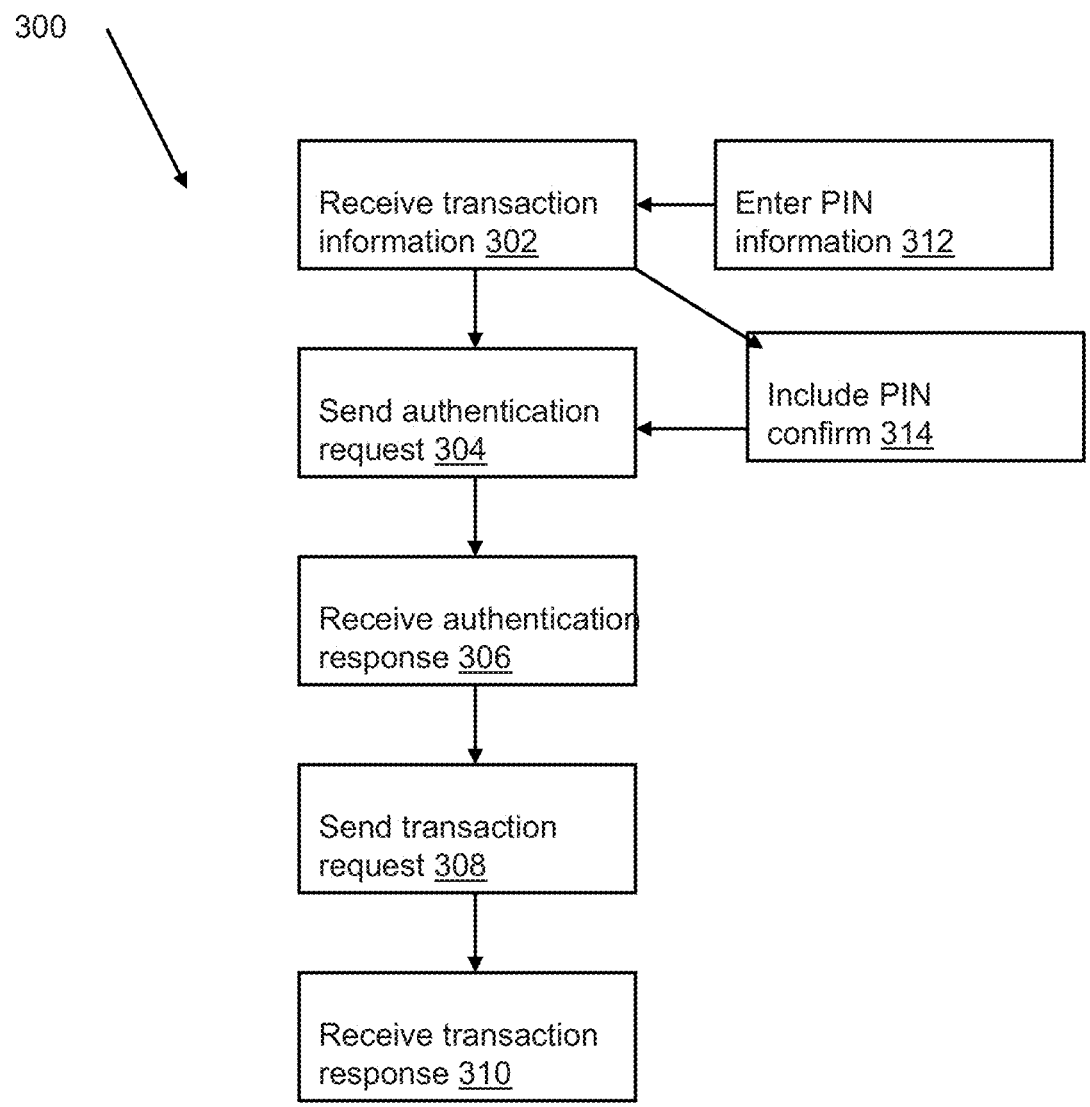
FIG. 5 is a flowchart for an example operation of the system of FIG. 3.

Referring to FIGS. 1, 2 and 4, shown is an example operation 300 of a payment application 16 configured for coordinating processing of a cardholder present financial transaction between a cardholder and a merchant system 13. the payment application 16 interacts with a computer processor.

At step 302, a receipt module 40 (e.g. via the imager 118) collects a financial amount of the financial transaction associated with merchant identification information of the merchant system 13. At step 304, the card reader and/or pin modules 42,46 send an authentication request using a wireless communication protocol 52 configured for proximity communication between the communication interface 102 of the computer device 12 and the wireless communication enabled integrated circuit (IC) chip 19 of the payment card 20, the authorization request including an IC command expected by computer hardware 21 of the IC chip 19. At step 306, the card reader and/or pin modules 42,46 receive an authentication response from the computer hardware 21 of the IC chip 19 by the wireless communication protocol 52, the authentication response including an encrypted value 28 generated by the computer hardware 21 of the IC chip 19. At step 308, the transaction module 48, in a network 11 communication path that can bypass (e.g. does not involve) the merchant system 13 and processing systems 17, sends the transaction request 32 directly to the payment processing system 14 for settlement of the financial transaction, the transaction request 32 including the transaction amount and the encrypted value. At step 310, the receipt module 40 receives confirmation of settlement of the financial transaction from the payment processing system 14 (preferably) and/or the merchant system 13.

Further optional steps can include: at step 312 of entering PIN data 27 using the data entry interface 104 of the computer device 12 that is separate from the data entry interface 204 of the merchant system 13 and at step 314 including the PIN data 27 in the authentication request, such that the authentication response includes PIN authentication data confirmed by the computer hardware 21 of the IC chip 19 and including the PIN authentication data in the transaction response.

Computer Device 12

Referring to FIG. 3, each computer device 12 can be a wireless-enabled (e.g. WiFi, WAN, etc.) personal data assistant, or email-enabled wireless telephone. In addition, the wireless communications are not limited to only facilitating transmission of text data (e.g. encrypted) and can therefore be used to transmit image data, audio data or multimedia data, for example, as desired. It is also recognised that the computer device 12 can be a desktop computer having a wireless enabled communication interface onboard (i.e. as part of the desktop computer hardware) or as a coupled peripheral device (off board computer hardware—not shown) that acts an intermediary wireless communication device for implementing (e.g. by proxy) the wireless communication protocol 52 between the wired network interface of the desktop computer 12 and the chip 19.

As shown in FIG. 3, the computer device 12 comprises the communication interface 102, the user interface 104, and a data processing system 106 in communication with the communication interface 102 and the user interface 104. The network interface 102 can comprise one or more antennas for wireless communication over the communications network 11. Preferably, the user interface 104 comprises a data entry device (such as keyboard, microphone, touch screen or writing tablet), and a display device (such as an LCD display that could also be configured as the touch screen).

The data processing system 106 includes a central processing unit (CPU) 108, otherwise referred to as a computer processor, and a non-volatile memory storage device (e.g. DISC) 110 (such as a magnetic disc memory or electronic memory) and a read/write memory (RAM) 112 both in communication with the CPU 108. The memory 110 includes data which, when loaded into the RAM, comprise processor instructions for the CPU 108 which define memory objects for allowing the computer device 12 to communicate with the chip 19 and the processing system 14 (e.g. one or more processing servers) over the communications network 11, as well as optionally with the merchant system 13 (e.g. a website running on a merchant computer—not shown—and accessed via the network 11). The computer device 12, and the processor instructions for the CPU 108 will be discussed in greater detail below.

The data processing system 106 can include the imager 118 (e.g. a camera enabled mobile device). In this example, the user interface 204 of the computer device 8 (see FIG. 4) can display the transaction information of the transaction request 24 within range of the camera 118 of the computer device 12 for subsequent receipt as a recorded image. In this way, the computer 12 can collect some or all of the transaction information of the transaction request 24, for example as an encoded image (e.g. barcode) containing transaction details decodable by the computer device 12 and/or the payment processing system 14 in the event that some or all of the barcode details are included in the financial transaction request 32 communicated between the computer 12 and the payment processing system 14.

The CPU 108 is configured for execution of a payment application 16 (see FIG. 2) for facilitating communication between the processing system 14, optionally the merchant system 13, the device 12, and the chip 19 of the payment card 20. For example, it is recognised that the application 16 is used to coordinate the communications between the various devices 12,13,14 over the network 11 and to wirelessly communicate with the hardware 21 of the chip 19 (at least for purposes of providing and confirming acceptance of the PIN data 27 with the hardware 21), and as such the application 16 functionality can be implemented by the CPU 108 to facilitate the generation, receipt, and processing of the wireless communications.

The CPU 108 facilitates performance of the mobile device 12 configured for the intended task (e.g. of the respective module(s) of the payment application 16) through operation of the communication interface 102, the user interface 104 and other application programs/hardware (e.g. web browser made available to the payment application 16) of the computer device 12 by executing task related instructions. These task related instructions can be provided by an operating system, and/or software applications located in memory, and/or by operability that is configured into the electronic/digital circuitry of the processor(s) 108 designed to perform the specific task(s). Further, it is recognized that the device infrastructure 106 can include a computer readable storage medium 110 coupled to the processor 108 for providing instructions to the processor 108 and/or to load/update the instructions. The computer readable medium 110 can include hardware and/or software such as, by way of example only, memory cards such as flash memory or other solid-state memory.

Further, it is recognized that the computer device 12 can include the executable applications comprising code or machine readable instructions for implementing predetermined functions/operations including those of an operating system and the modules 40,42,46,48, for example. The processor 108 as used herein is a configured device and/or set of machine-readable instructions for performing operations as described by example above, including those operations as performed by any or all of the modules 40,42,46,48. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example.

Computer Device 8

Referring to FIG. 4, each merchant device 8 can include a wireless-enabled (e.g. WiFi, WAN, etc.) personal data assistant, or email-enabled wireless telephone. In addition, the wireless communications are not limited to only facilitating transmission of text data (e.g. encrypted) and can therefore be used to transmit image data, audio data or multimedia data, for example, as desired, using the network communication protocol 50. It is also recognised that the computer device 8 can be a desktop computer, however preferably is a server device or series of server devices and optionally including a POS terminal. As shown in FIG. 4, the computer device 8 comprises the communication interface 202, the user interface 204, and a data processing system 206 in communication with the communication interface 202 and the user interface 204. The network interface 202 can comprise one or more antennas for wireless communication over the communications network 11. The user interface 204 can comprise a data entry device (such as keyboard, microphone, touch screen or writing tablet), and a display device (such as an LCD display that could also be configured as the touch screen). It is recognised that user interface 204 is separate from the user interface 104 of the cardholder computer device 12. Further, it is recognised that the network communication interface 202 is separate from the communication interface 102 of the cardholder computer device 12, such that the network communication interface 202 and the communication interface 102 are configured to separately and independently communicate with the payment processing system 14 using the network communication protocol 50 over the communication network 11.

The data processing system 206 includes a central processing unit (CPU) 208, otherwise referred to as a computer processor, and a non-volatile memory storage device (e.g. DISC) 210 (such as a magnetic disc memory or electronic memory) and a read/write memory (RAM) 212 both in communication with the CPU 208. The memory 210 includes data which, when loaded into the RAM, comprise processor instructions for the CPU 208 which define memory objects for allowing the computer device 8 to communicate with the computer device 12 and the processing system 14 (e.g. one or more processing servers) over the communications network 11. The computer device 8 can optionally be embodied as a website running on a merchant computer and accessed via the network 11. The computer device 8, and the processor instructions for the CPU 208 will be discussed in greater detail below.

The CPU 208 is configured for execution of the merchant system 13 and the processing systems 17 (see FIG. 1) for facilitating communication between the payment processing system 14, the computer device 12, and POS terminals including card chip readers. For example, it is recognised that the merchant system 13 is used to communicate between the various devices 12,14 over the network 11, such the merchant system 13 functionality can be implemented by the CPU 208 to facilitate the generation, receipt, and processing of the network 11 communications (both wired and wireless) using network communication protocol 50.

The CPU 208 facilitates performance of the mobile device 8 configured for the intended task (e.g. of the respective module(s) of the merchant system 13 and the processing systems 17 related to transaction generation, processing and confirmation) through operation of the communication interface 202, the user interface 204 and other application programs/hardware (e.g. web service made available to the payment application 16) of the computer device 8 by executing task related instructions. These task related instructions can be provided by an operating system, and/or software applications located in memory, and/or by operability that is configured into the electronic/digital circuitry of the processor(s) 208 designed to perform the specific task(s). Further, it is recognized that the device infrastructure 206 can include a computer readable storage medium 210 coupled to the processor 208 for providing instructions to the processor 208 and/or to load/update the instructions. The computer readable medium 210 can include hardware and/or software such as, by way of example only, memory cards such as flash memory or other solid-state memory.

Further, it is recognized that the computer device 8 can include the executable applications comprising code or machine readable instructions for implementing predetermined functions/operations including those of an operating system and the merchant system 13 and the processing systems 17 functionality, for example. The processor 208 as used herein is a configured device and/or set of machine-readable instructions for performing operations as described by example above, including those operations as performed by any or all of the merchant system 13 and the processing systems 17 functionality. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

I claim:

1. A wireless enabled mobile telephone with an executable payment application stored thereon, the payment application configured for coordinating processing of a cardholder present transaction between a cardholder and a merchant system involving an electronic merchant transaction request from the merchant system separate from an electronic cardholder transaction request using the mobile telephone of the cardholder, the merchant system under operational control by the merchant and including an order and account processing system for managing a record of the cardholder present transaction, the mobile telephone comprising:

a memory for storing the payment application, the payment application including a card reader module;

a display of a user interface for displaying information of the cardholder present transaction to the cardholder, the user interface of the mobile telephone under operational control by the cardholder;

a network interface for communicating with a payment processing system over a communications network using a network communication protocol and for communicating with a wireless communication enabled integrated circuit (IC) chip of a payment card of the cardholder using a wireless communication protocol;

wherein the payment application instructs a computer processor of the mobile telephone to perform the following steps of:

receiving and displaying the merchant transaction request as communicated from the merchant system to the mobile telephone, the merchant transaction request including a displayed transaction amount on the user interface of the cardholder present transaction associated with merchant identification information of the merchant system;

after receiving the merchant transaction request and prior to sending the cardholder transaction request, initiating an authentication request via the user interface of the payment card based on receipt of the merchant transaction request by sending the authentication request by the card reader module using the wireless communication protocol to the IC chip of the payment card when determined in physical proximity with an antenna of the network interface, the authentication request including an IC command expected by computer hardware of the IC chip and a PIN entered by the cardholder into the user interface, the authentication request sent directly, between the card reader module and the payment card instead of involving the merchant system;

receiving an authentication response by the card reader module from the computer hardware of the IC chip by the network interface using the wireless communication protocol, the authentication response including an encrypted value generated by the computer hardware of the IC chip and PIN authentication data as an approval of the PIN matching PIN data stored on the IC chip, the authentication response sent directly between the card reader module and the payment card instead of involving the merchant system thereby confirming that the payment card is present;

sending the cardholder transaction request electronically via the user interface directly to the payment processing system in a network communication path over the communications network that bypasses the merchant system for settlement of the cardholder present transaction, the cardholder transaction request including the transaction amount and the encrypted value representing that the payment card is present during the cardholder present transaction; and receiving confirmation of settlement of the cardholder present transaction directly from the payment processing system rather than via the merchant system for display on the user interface.

2. The wireless enabled mobile telephone of claim 1, wherein the program application is further configured to instruct the computer processor to perform the steps of:

entering PIN data using a data entry interface of the mobile telephone that is separate from a data entry interface of the merchant system; and including the PIN data in the authentication request, such that the authentication response includes the PIN authentication data confirmed by the computer hardware of the IC chip.

3. The wireless enabled mobile telephone of claim 1, wherein the merchant system is a POS terminal.

4. The wireless enabled mobile telephone of claim 1, wherein the merchant system is an online merchant order interface accessed over the communications network by the mobile telephone using the network communication protocol for the network communication path that is different from the wireless communication protocol.

5. The wireless enabled mobile telephone of claim 1, wherein the transaction request includes an indication identifying which user interface was used to enter PIN data used in generation of the PIN authentication data.

6. The wireless enabled mobile telephone of claim 1, further comprising an imager configured via the payment application to collect transaction information, wherein at least a portion of data associated with the merchant transaction request is obtained from a recorded image processed by the imager.

7. The wireless enabled mobile telephone of claim 1, wherein the merchant transaction request includes a purchase type and a transaction type.

8. The wireless enabled mobile telephone of claim 1, wherein the encrypted value is a cryptogram.

9. The wireless enabled mobile telephone of claim 1, wherein the wireless communication protocol is near field communication (NFC).

* * * * *